(12) United States Patent
Reddy Kollam et al.

(10) Patent No.: US 12,228,081 B2
(45) Date of Patent: Feb. 18, 2025

(54) AIR TURBINE STARTER WITH NOZZLE RETENTION MECHANISM

(71) Applicant: Unison Industries, LLC, Jacksonville, FL (US)

(72) Inventors: Ramana Reddy Kollam, Bangalore (IN); Parmeet Singh Chhabra, Bangalore (IN); David Raju Yamarthi, Bangalore (IN); David Allan Dranschak, Union, OH (US); Steven Ryan Kerley, Columbus, OH (US); Mark Leslie Rickert, Dayton, OH (US)

(73) Assignee: Unison Industries, LLC, Jacksonville, FL (US)

( * ) Notice: Subject to any disclaimer, the term of this patent is extended or adjusted under 35 U.S.C. 154(b) by 11 days.

(21) Appl. No.: 17/398,415

(22) Filed: Aug. 10, 2021

(65) Prior Publication Data

US 2022/0065169 A1  Mar. 3, 2022

(30) Foreign Application Priority Data

Aug. 25, 2020  (IN) .............................. 202011036533

(51) Int. Cl.
*F02C 7/277*  (2006.01)

(52) U.S. Cl.
CPC ........ *F02C 7/277* (2013.01); *F05D 2220/323* (2013.01); *F05D 2260/85* (2013.01)

(58) Field of Classification Search
CPC .......... F02C 7/277; F02C 7/27; F01D 21/045; F01D 9/047; F01D 9/00; F01D 9/04–048; F01D 17/10–18; F05D 2260/33; F05D 2260/36; F05D 2260/31–311
See application file for complete search history.

(56) References Cited

U.S. PATENT DOCUMENTS

| | | | | |
|---|---|---|---|---|
| 2,989,848 | A | * | 6/1961 | Paiement .................. F02C 7/27 415/115 |
| 3,097,824 | A | * | 7/1963 | Alexanderson ......... F01D 21/06 415/217.1 |
| 4,292,810 | A | | 10/1981 | Glenn |
| 4,639,188 | A | * | 1/1987 | Swadley ............... F01D 21/045 415/196 |
| 6,623,238 | B2 | | 9/2003 | Langston et al. |
| 8,087,874 | B2 | | 1/2012 | Jardine et al. |
| 8,376,700 | B2 | * | 2/2013 | Le Saint ................. F02C 7/277 415/214.1 |
| 8,672,620 | B2 | | 3/2014 | Zawilinski et al. |
| 8,672,638 | B2 | | 3/2014 | Zawilinski et al. |

(Continued)

FOREIGN PATENT DOCUMENTS

| | | | |
|---|---|---|---|
| EP | 0343412 A1 | | 11/1989 |
| GB | 779056 A | * | 7/1957 |
| GB | 866046 A | | 4/1961 |

*Primary Examiner* — Ehud Gartenberg
*Assistant Examiner* — Henry Ng
(74) *Attorney, Agent, or Firm* — McGarry Bair PC

(57) ABSTRACT

An air turbine starter having a housing defining an interior with a primary inlet and a primary outlet to define a primary air flow path from the primary inlet to the primary outlet. A nozzle is located within the interior and has circumferentially spaced vanes. A shroud is also located within the interior and circumscribes at least a portion of the vanes. A retention mechanism constrains the axial movement of nozzle.

19 Claims, 6 Drawing Sheets

(56) References Cited

U.S. PATENT DOCUMENTS

| | | | |
|---|---|---|---|
| 8,702,385 B2* | 4/2014 | Burdgick | F01D 1/02 |
| | | | 29/889.22 |
| 9,045,984 B2* | 6/2015 | Feigleson | F01D 25/285 |
| 9,334,756 B2 | 5/2016 | Ring et al. | |
| 9,752,508 B2 | 9/2017 | Geck et al. | |
| 2012/0042659 A1 | 2/2012 | Zawilinski et al. | |
| 2015/0082805 A1* | 3/2015 | Zeiner | F02C 7/277 |
| | | | 60/788 |
| 2017/0370294 A1 | 12/2017 | Gentile et al. | |
| 2018/0283694 A1 | 10/2018 | Greenfield et al. | |
| 2018/0347669 A1* | 12/2018 | Nayak | F16H 48/06 |
| 2019/0292924 A1* | 9/2019 | Moore | F01D 17/16 |
| 2020/0024997 A1* | 1/2020 | Papin | F01D 25/162 |
| 2023/0051167 A1* | 2/2023 | Gaillard | F01D 5/225 |

* cited by examiner

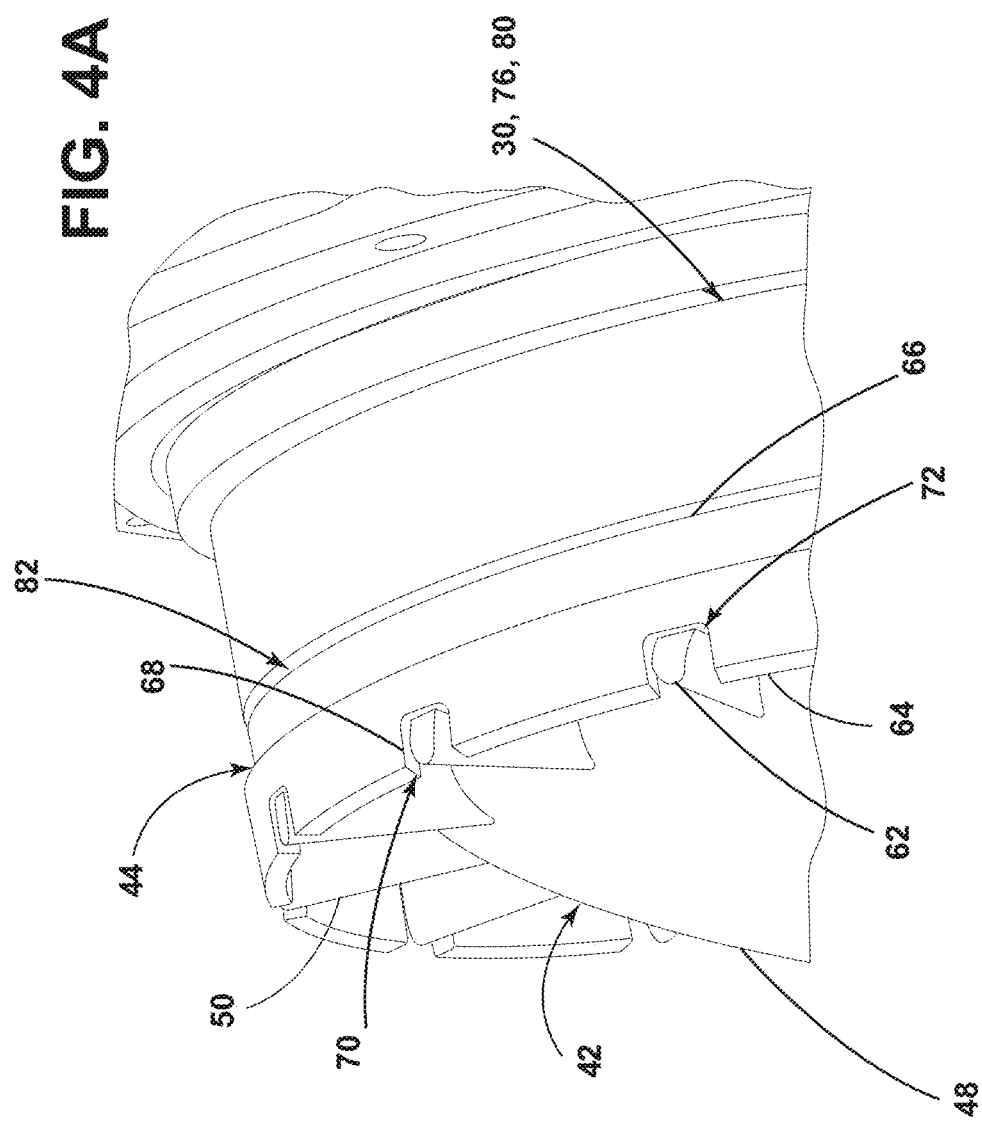

AIR TURBINE STARTER WITH NOZZLE RETENTION MECHANISM

CROSS REFERENCE TO RELATED APPLICATIONS

This application claims priority to Indian Provisional Application No. 202011036533, filed Aug. 25, 2020, which is incorporated herein by reference in its entirety

TECHNICAL FIELD

The disclosure generally relates to an air turbine starter, and, more specifically, to a retaining mechanism for a turbine in the air turbine starter.

BACKGROUND

Turbine engines, for example gas turbine engines, are regularly started using an air turbine starter, which is mechanically coupled to a rotor of the turbine engine. Air turbine starters are typically mounted to the engine through a gearbox or other transmission assembly. The transmission transfers power from the air turbine starter to the engine to assist in starting the engine. The air starter turbine includes an air-driven turbine that rotationally drives the gearbox. A source of high-pressure air flows air through the turbine to affect a rotation of the turbine, which drives the gearbox, which, in turn, rotates the rotor of the turbine engine during a starting sequence. During operation, the high-pressure air applies an axial load on the turbine as well as effecting a rotation of the turbine.

BRIEF DESCRIPTION

Aspects and advantages of the disclosure will be set forth in part in the following description, or may be obvious from the description, or may be learned through practice of the disclosure.

In one aspect, the disclosure relates to an air starter including a housing defining an interior having a primary inlet and a primary outlet to define a primary air flow path from the primary inlet to the primary outlet. A nozzle is located within the interior and having circumferentially spaced vanes. A shroud is located within the interior and circumscribing at least a portion of the vanes. A turbine is located within the interior, rotatable about a rotational axis, and having circumferentially spaced blades. A physical interference is located between at least one of the nozzle and the shroud or the shroud and the housing, wherein the nozzle is axially constrained in downstream movement along the primary air flow path by the physical interference.

In another aspect, the disclosure relates to an assembly including an assembly comprising, a housing defining an interior having a primary inlet and a primary outlet to define a primary air flow path from the primary inlet to the primary outlet. A nozzle is located within the interior and having circumferentially spaced vanes. A shroud is located within the interior and circumscribing at least a portion of the vanes. A physical interference is located between at least one of the nozzle and the shroud or the shroud and the housing, wherein the nozzle is axially constrained in downstream movement along the primary air flow path by the physical interference.

These and other features, aspects and advantages of the present disclosure will become better understood with reference to the following description and appended claims.

The accompanying drawings, which are incorporated in and constitute a part of this specification, illustrate aspects of the disclosure and, together with the description, serve to explain the principles of the disclosure.

BRIEF DESCRIPTION OF THE DRAWINGS

In the drawings:

FIG. 4A is an enlarged perspective view of a portion of the nozzle and shroud of FIG. 3 shown in an assembled condition.

DETAILED DESCRIPTION

Figure 1:
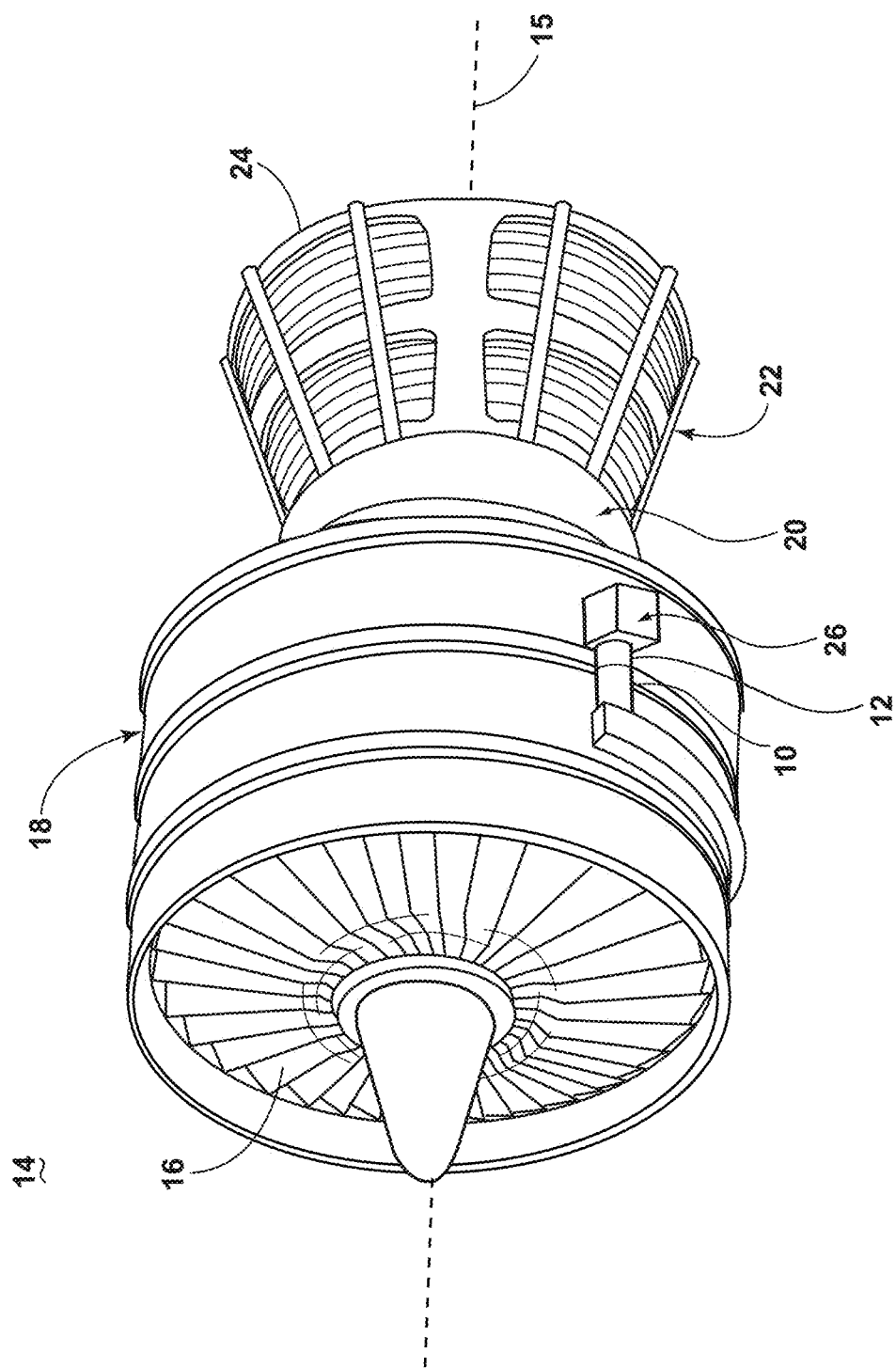
FIG. 1 is a schematic illustration of a turbine engine with an air turbine starter.

Aspects of the disclosure described herein are directed to an air turbine starter, useful for starting a turbine engine. The aspects may be to the air turbine starter alone or in combination with the turbine engine. Air turbine starters include a nozzle upstream of a rotatable turbine, with the nozzle guiding the flow of the incoming air to the rotatable turbine. An aspect of the disclosure relates to constraining the movement of a nozzle located upstream of a rotatable turbine of the air turbine starter. The relatively high-pressure of the pressurized air supplied to rotate the turbine may apply a load to the nozzle as it passes through the nozzle to affect a rotation of the turbine. The loading of the nozzle may be sufficient to cause a portion of the nozzle to abut a portion of the rotating turbine, which may premature wear the pieces. One such example of loading is an axial loading of the nozzle.

A prior solution to prevent axial movement of the nozzle when subjected to the pressure loading is to cast the nozzle and the surrounding housing, such as a surrounding shroud, as a single piece. Casting limits the type of materials and requires a minimum thickness depending on the nature of the materials used to form the casting. Casting can also limit the geometry of the nozzle, especially the shape and arrangement of the vanes forming the nozzle.

This disclosure describes solutions for making the air turbine starter such that the nozzle is properly constrained in its movement, especially axial movement, without the need to cast the nozzle as a single piece with the surrounding housing, especially the shroud.

For purposes of illustration, the present disclosure will be described with respect to a starter for a turbine engine. For example, the disclosure can have applicability in other vehicles or engines, and can be used to provide benefits in industrial, commercial, and residential applications.

As used herein, the term "upstream" refers to a direction that is opposite the fluid flow direction, and the term "downstream" refers to a direction that is in the same direction as the fluid flow. The term "fore" or "forward" means in front of something and "aft" or "rearward" means behind something. For example, when used in terms of fluid flow, fore/forward can mean upstream and aft/rearward can mean downstream.

Additionally, as used herein, the terms "radial" or "radially" refer to a direction away from a common center. For example, in the overall context of a turbine engine, radial refers to a direction along a ray extending between a center longitudinal axis of the engine and an outer engine circumference. Furthermore, as used herein, the term "set" or a "set" of elements can be any number of elements, including only one.

All directional references (e.g., radial, axial, proximal, distal, upper, lower, upward, downward, left, right, lateral, front, back, top, bottom, above, below, vertical, horizontal, clockwise, counterclockwise, upstream, downstream, forward, aft, etc.) are only used for identification purposes to aid the reader's understanding of the present disclosure, and do not create limitations, particularly as to the position, orientation, or use of aspects of the disclosure described herein. Connection references (e.g., attached, coupled, secured, fastened, connected, and joined) are to be construed broadly and can include intermediate members between a collection of elements and relative movement between elements unless otherwise indicated. As such, connection references do not necessarily infer that two elements are directly connected and in fixed relation to one another. The exemplary drawings are for purposes of illustration only and the dimensions, positions, order and relative sizes reflected in the drawings attached hereto can vary.

Referring to FIG. 1, an air turbine starter (ATS) 10 is coupled to an accessory gear box (AGB) 12, which are both schematically illustrated as being mounted to a turbine engine 14 such as a gas turbine engine. The turbine engine 14 defines an axial direction 15 as shown. The turbine engine 14 includes an air intake with a fan 16 that supplies air to a high-pressure compression region 18. The air intake with the fan 16 and the high-pressure compression region 18 collectively are known as the "cold section" or turbine section of the turbine engine 14 upstream of the combustion. The high-pressure compression region 18 provides a combustion chamber 20 with high-pressure air. In the combustion chamber 20, the high-pressure air is mixed with fuel and combusted. Hot and pressurized combustion gases pass through a high-pressure turbine region 22 and a low-pressure turbine region 24 before exhausting from the turbine engine 14. As the combustion gases pass through the high-pressure turbine region 22 and the low-pressure turbine region 24, rotational energy is extracted from the flow of the gases passing through the turbine engine 14. A shaft can connect the high-pressure turbine region 22 to the high-pressure compression region 18 to power the compression mechanism. The low-pressure turbine can be coupled to the fan 16 of the air intake by way of a shaft to power the fan 16.

The AGB 12 is coupled to the turbine engine 14 at either the high-pressure turbine region 22 or the low-pressure turbine region 24 by way of a mechanical power take-off 26. The mechanical power take-off 26 contains multiple gears and components for mechanical coupling of the AGB 12 to the turbine engine 14. The ATS 10 can be mounted on the outside of either the air intake region containing the fan 16 or on the core near the high-pressure compression region 18.

Figure 2:
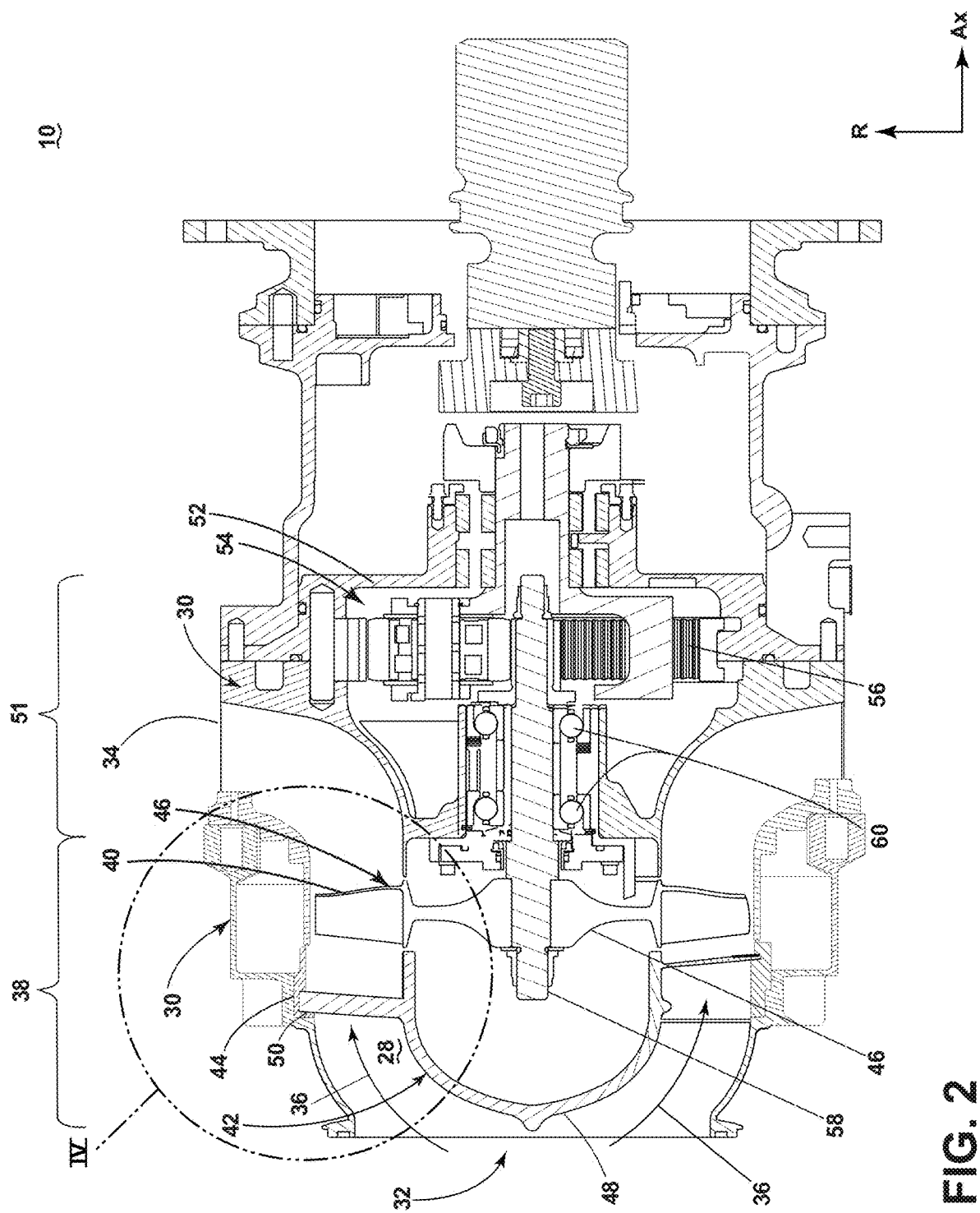
FIG. 2 is a cross-sectional view of the air turbine starter including several aspects of this disclosure.

Referring now to FIG. 2, the air turbine starter 10 is shown in cross-section. A coordinate system illustrating an axial axis (Ax) and a radial axis (R) is included. The axial axis (Ax) can be parallel to or non-parallel to the axial direction 15. The ATS 10 includes a starter housing 30 defining an interior 28 with a primary inlet 32, a primary outlet 34. A flow path 36 extends between the inlet 32 and outlet 34 for communicating a flow of gas therethrough. In one non-limiting example, the gas is air and is supplied from either a ground-operating air cart, an auxiliary power unit, or a cross-bleed start from an engine already operating.

A turbine section 38 is located within the starter housing 30. The turbine section 38 includes a nozzle 42, a shroud 44, and a turbine 46 with circumferentially spaced blades 40. The circumferentially spaced blades 40 of the turbine 46 can be disposed within the flow path 36 for rotatably extracting mechanical power from the flow of gas along the flow path 36. The transfer of the extracted mechanical power can be managed with a turbine shaft 58. The coordinate system can be with respect to a rotational axis of the turbine shaft 58. As a non-limiting example the turbine shaft 58 can rotate about the axial axis (Ax).

The nozzle 42 includes a central hub 48 and a set of circumferentially spaced vanes 50. The vanes 50 can be in the form of airfoils, as can be the blades 40. The nozzle 42 and the shroud 44 can be made as two separate pieces assembled together with thermal fits, which can eliminate the traditional approach of casting a nozzle and shroud as one piece. A benefit of the nozzle 42 and the shroud 44 being two separate pieces is that it can allow for the nozzle 42, the shroud 44, and the housing 30 to be made out of the same or different materials. An example of such materials can include lightweight metals such as aluminum, stainless steel, iron, or titanium. The materials can also include but not limited to, additive manufacturing or die-casting of high strength materials with a thinner trailing edge thickness giving structural and aero performance advantage. Further, while a single turbine 46 is illustrated, it is contemplated that multiple turbines 46 can be provided to form multiple stages within the ATS 10.

A gear box section 51 is downstream of the turbine section 38 and includes a gear box 52 mounted within the starter housing 30. A gear train 54 can be disposed within the gear box 52 and drivingly coupled with the turbine 46. In the illustrated example, the gear train 54 is a planetary gear system that includes a ring gear 56, planetary gears, and sun gear. It will be understood that the gear train 54 can include any suitable gear assembly including, but not limited to, a pinion gear assembly, or the like. The turbine shaft 58 is coupled to the gear train 54 and rotatably supported by a pair of turbine bearings 60.

Figure 3:
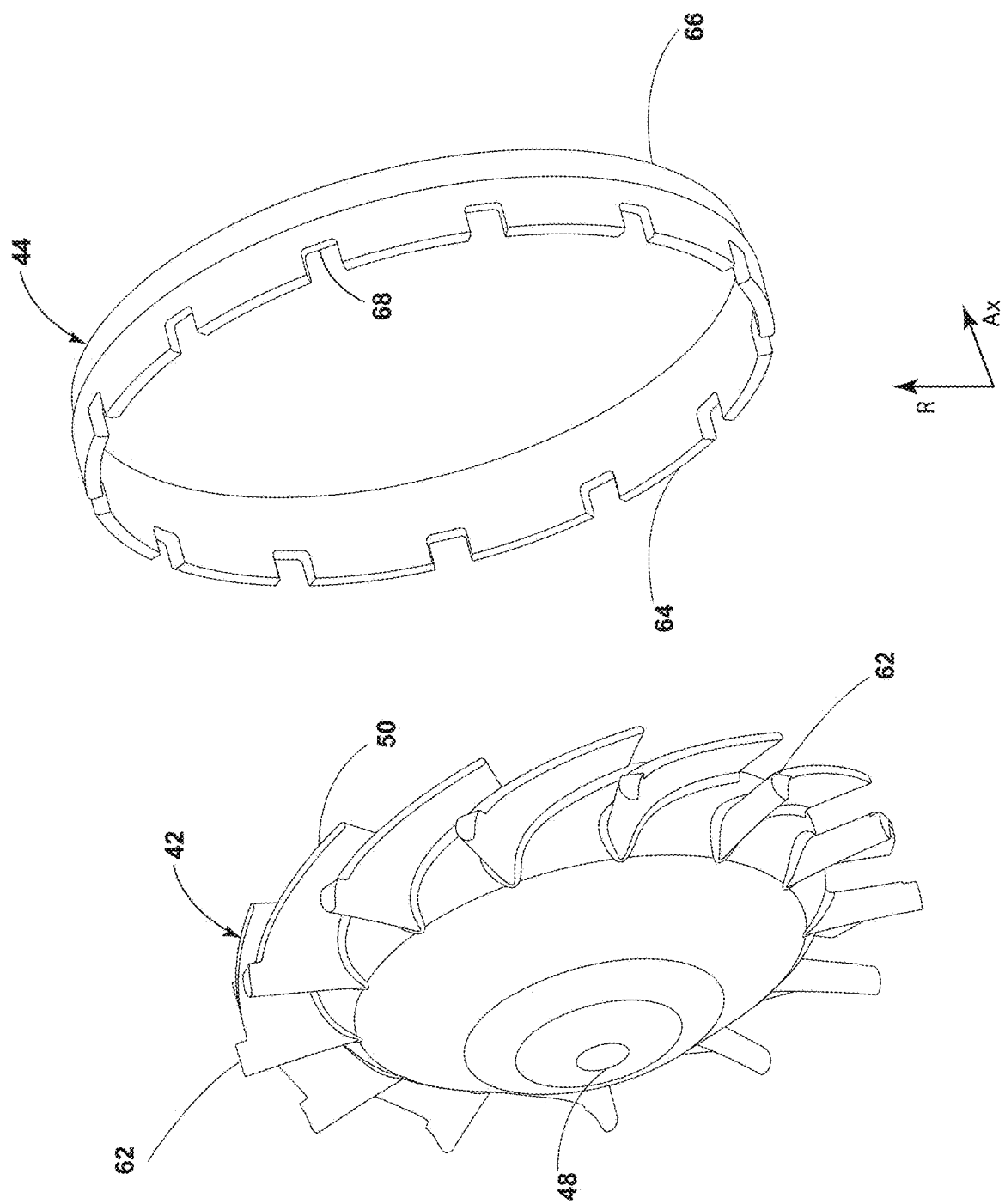
FIG. 3 is an exploded view illustrating a nozzle and a shroud of the air turbine starter.

Now referring to FIG. 3, the nozzle 42 and the shroud 44 of the ATS 10 are shown in an exploded view to better illustrate the two separate pieces. The shroud 44 is primarily in the shape of a ring with a nozzle edge 64 and a housing edge 66. The shroud 44 can include a plurality of slots 68 opening into the nozzle edge 64. The plurality of vanes 50 are circumferentially spaced around the hub 48. The vanes 50 can include at least one radial protrusion 62 at the distal end or tip of the vanes 50. The protrusions 62 are paired with a corresponding slot 68. When the air starter is assembled, the protrusions 62 are received in the corresponding one of the plurality of slots 68.

A benefit of the protrusions 62 being received within the plurality of slots 68 is that it creates a physical interference between the protrusions 62 and the slots 68. This physical interference limits the relative axial movement between the nozzle and the shroud. The physical interference also restricts the relative rotational movement of the nozzle 42 and the shroud 44. Thus, assuming the shroud 44 is essentially fixed against axial movement and/or rotational movement, the nozzle is correspondingly fixed. Thus, during operation, when high-pressure air is passed through the nozzle 42, the load acting on the nozzle from the high-pressure air does not cause the nozzle to move axially or to rotate because of the physical interference provided by the protrusions 62 and the slots 68. With this physical interference structure, the nozzle 42 and the shroud 44 can be made separately, unlike they have been in the past. By making these parts separately and then coupling together, the cost of making the pieces is much less, especially since the pieces used to be a single piece casting, which was complex and relatively expensive. Another benefit to the two-piece structure is that the nozzle 42 and shroud 44 can be make of different materials. Yet another benefit is that the assembly of the pieces is now a simple drop in or build up assembly.

Referring to FIG. 4A, a portion of the nozzle 42 and the shroud 44 of the ATS 10 are shown assembled to better illustrate the operational states of the protrusions 62 and slots 68. In the assembled and/or operational state, the protrusions 62 are received in the slots 68 and the nozzle 42 is physically coupled to the shroud 44 creating a first physical interference 70. In other variations, the shroud 44 can have an element similar to the protrusion 62 and the vanes 50 can have a complementary element similar to the slots 68. In both variations, the nozzle 42 can effectively "grip" the shroud 44 as the protrusions 62 are recessed into the slots 68, creating the first physical interference 70. In another variation, the vanes 50 can lack protrusions 62 and the shroud 44 can lack slots 68. Therefore, the first physical interference 70 can include the contact of the nozzle 42 with the shroud 44 and/or the contact between the housing 30, the nozzle 42 and/or the shroud 44.

The receipt of the protrusion 62 in the slot 68 need not be perfect. There can be some slop or tolerance between the protrusion 62 and slot 68, which can present itself as a space between at least a portion of the protrusion 62 and slot 68. One example of such a space is the gap 72. The gap 72 can compensate for thermal expansion or contraction of the protrusions 62 and/or slot 68 relative to each other, especially when the nozzle 42 and shroud 44 are made of different materials having different rates of thermal expansion. The thermal expansion or contraction of the protrusions 62 can include an interference fit, also known as a press fit, friction fit, thermal fit, etc. between the protrusions 62 and the slots 68 during high inlet air pressures.

Figure 4B:
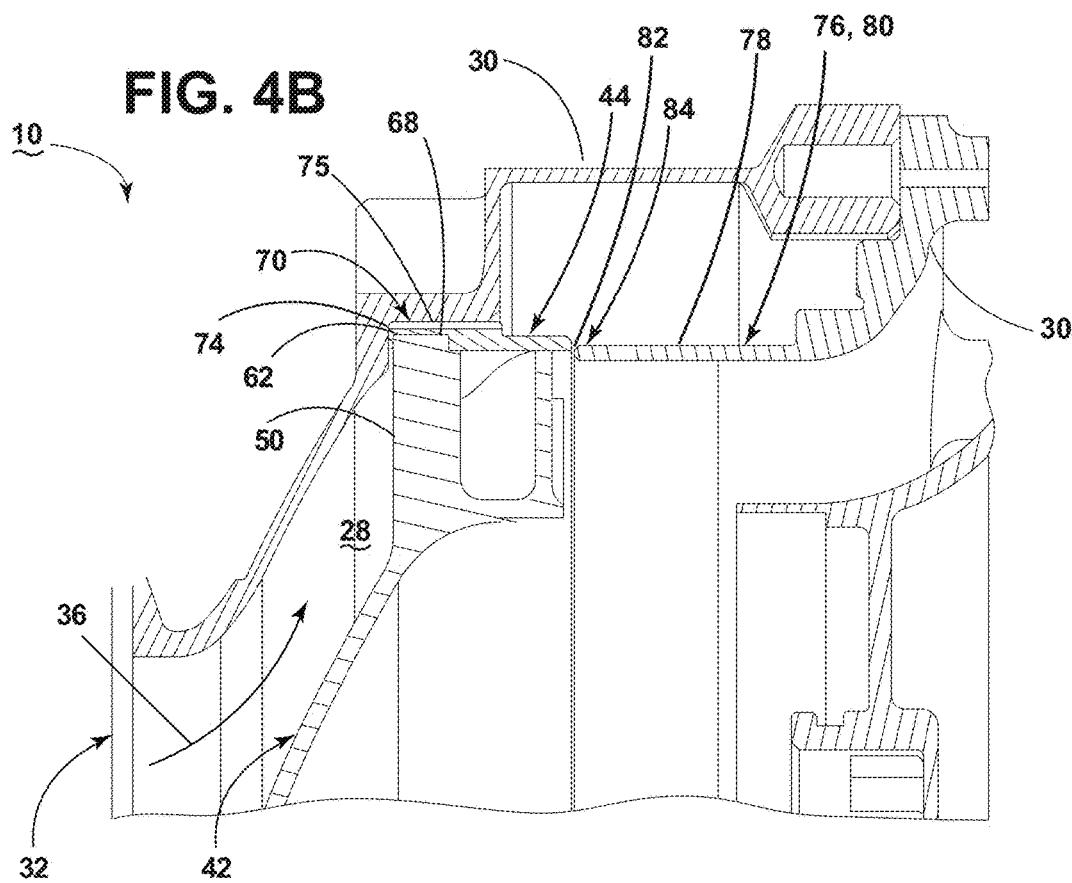
FIG. 4B is an enlarged cross-sectional view of the nozzle and shroud within the housing taken along line IV of FIG. 2

FIG. 4B illustrates an enlarged cross-sectional view of the nozzle 42 and shroud 44 within the housing 30 taken along line IV of FIG. 2. The housing 30 can include a seat 74, which receives a portion of the nozzle 42. The seat 74 receives a portion of the assembled nozzle 42 and shroud 44. The seat 74, limits the axial upstream movement of the nozzle 42 and shroud 44. The seat 74 also limits the radial movement of the nozzle 42 and shroud 44. The housing can include a radial gap 75 located between the nozzle 42 and the seat 74 and/or the shroud 44 and the seat 74. The radial gap 75 provides tolerance variation and/or room for thermal expansion between the nozzle 42, shroud 44 and the housing.

The radial gap 75 can also allow nozzle 42 and/or the shroud 44 to be coupled to the seat 74 of the housing 30 via thermal fitting. Thermal fitting can include high-pressure air entering the compression region 18 and increasing the load on the nozzle 42 and the shroud 44. The increasing load can cause friction to occur between the, nozzle 42, the shroud 44 and the housing 30, which can increase the temperature within the compression region 18. The changes in temperature can allow the nozzle 42 and the shroud 44 to expand or contract limiting the radial gap 75 within the housing 30.

The housing 30 can also include a turbine liner 76. The turbine liner 76 can be integrated or circumscribing with a portion 78 of the housing 30 creating a housing liner 80. The housing 30 can also include an axial gap or a housing gap 82. The housing gap 82 is between the housing edge 66 of the shroud 44 and the housing liner 80. At high-pressures, the nozzle 42 and the shroud 44 can become incapable of holding a load from the air intake within the high-pressure compression region 18. In response to the nozzle 42 and the shroud 44 becoming incapable of holding the load, the nozzle 42 and the shroud 44 can axially move into the housing gap 82. The axial movement of the nozzle 42 and shroud 44 can radially align or come in contact with the housing liner 80 eliminating the housing gap 82 and creating a second physical interference 84 within the ATS (10). The second physical interference 84 can restrict the shroud 44 and the nozzle 42 from coming in contact with the blades 40 of the turbine 46. Structures other than the turbine liner 76 can be provided in the housing 30 to create the second physical interference 84.

Figure 4C:
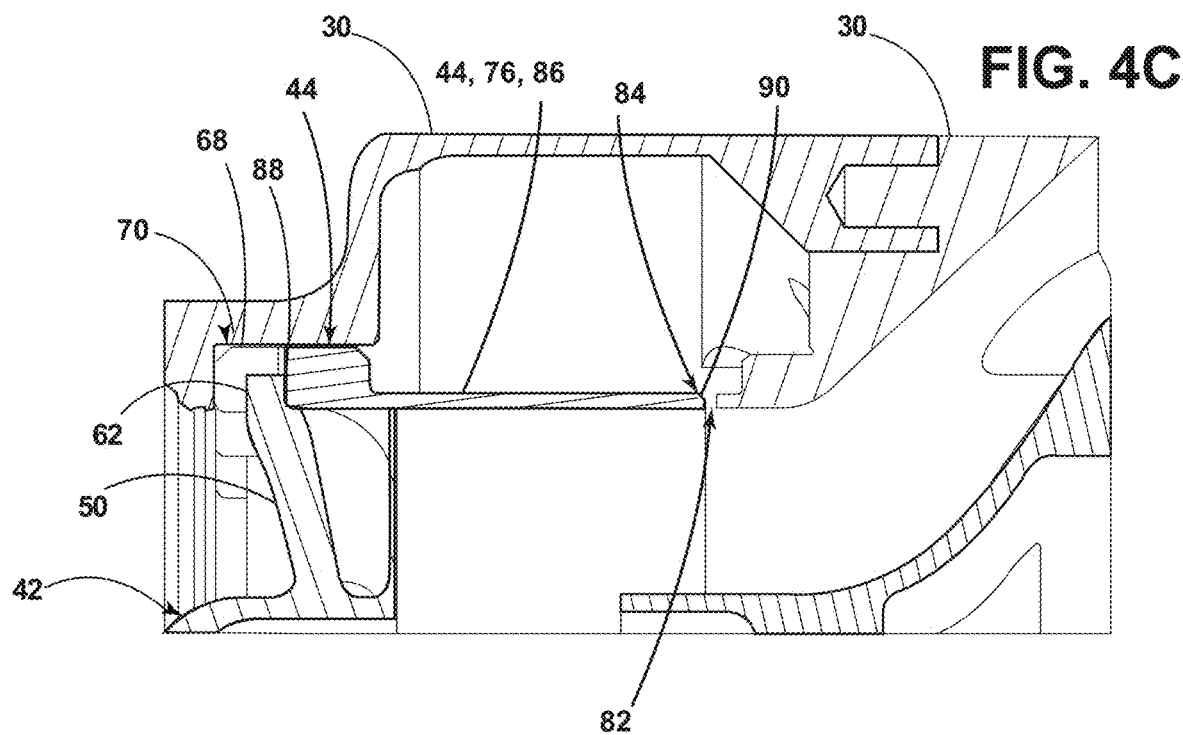
FIG. 4C illustrates an enlarged cross-section view of another variation of the nozzle and the shroud within the housing taken along line IV of FIG. 2.

FIG. 4C illustrates an enlarged cross-section view of another variation of the nozzle 42 and the shroud 44 within the housing 30 taken along line IV of FIG. 2. The shroud 44 can also integrate with the liner 76 or circumscribe with the liner 76 creating a shroud liner 86. The shroud liner 86 can include a first end 88 and a second end 90. The first end 88 can couple to the nozzle 42 and the housing 30. The first end 88 can include the first physical interface 70. The housing gap 82 can be located between the second end 90 of the shroud liner 86 and the housing 30. In response to the nozzle 42 and the shroud 44 becoming incapable of holding the load, the nozzle 42 and the shroud 44 can axially move into the housing gap 82. The axial movement of the nozzle 42 and shroud 44 can come in contact with the housing 30 eliminating the housing gap 82 and creating the second physical interference 84 within the ATS (10). The second physical interference 84 can restrict the nozzle 42 and the shroud liner 86 from coming in contact with the blades 40 of the turbine 46.

Figure 5:
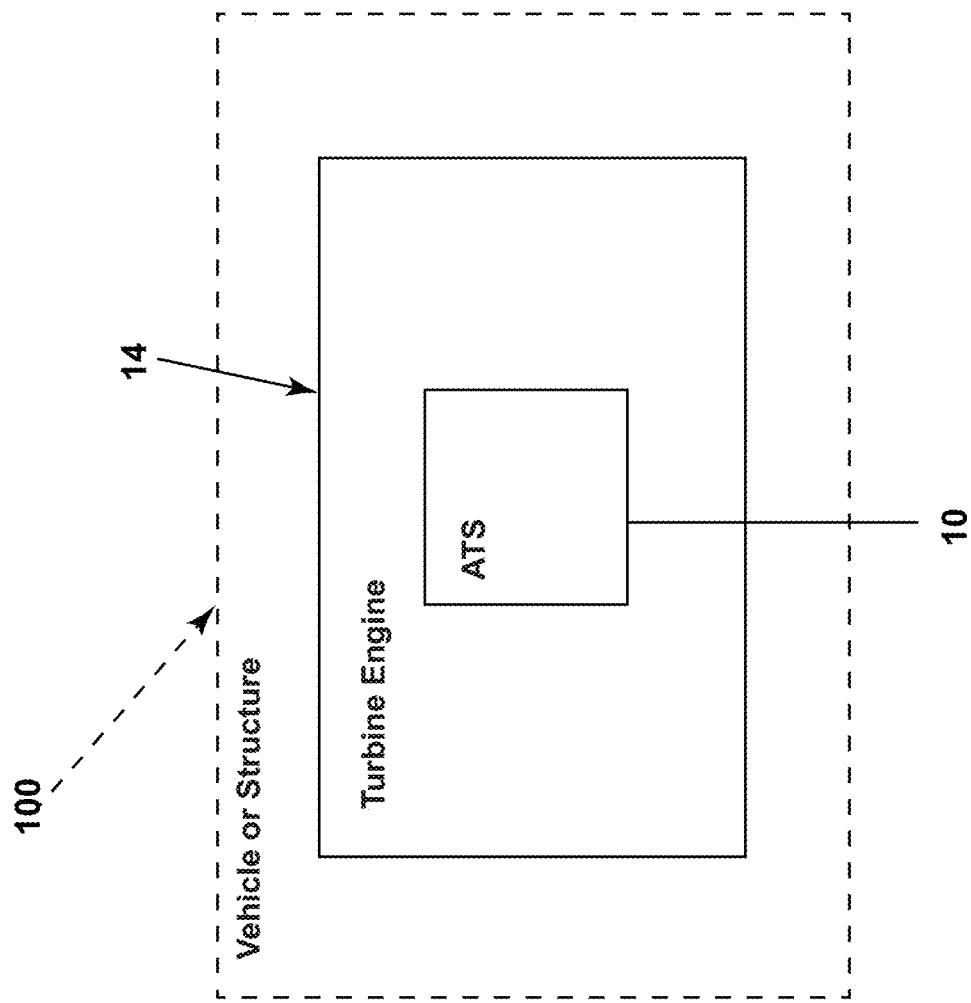
FIG. 5 is a schematic illustration of the turbine engine and the starter inside a vehicle from FIG. 1.

FIG. 5 is a schematic illustration of the turbine engine 14 and ATS 10 from FIG. 1, where the turbine engine 14 can be in a vehicle or structure 100. The vehicle or structure 100 can be, by way of non-limiting example, any vehicle on land, sea or air. Further, the vehicle or structure 100 can be, but is not limited to, a marine power plant, a wind turbine, or a small power plant. It is further considered that the turbine engine 14 can be any engine using a turbine with the ATS 10 or generator required by the vehicle or structure 100.

Some advantages associated with the disclosure discussed herein can include but are not limited to, eliminating the cause of high stresses and deformation of the nozzle by not requiring a high fit between the vanes of the nozzle and the primary air flow inlet. Another advantage is a wide range of material selection can be used to create the nozzle, shroud, and primary air flow inlet because casting as one piece is not necessary. An advantage of eliminating the need for casting can include reducing the thickness and high material strength. Also, the disclosure decreases part failure by allowing the nozzle to sustain high-pressures for better performance in a reliable low-cost solution.

Many other possible configurations in addition to those shown in the above figures are contemplated by the present disclosure. To the extent not already described, the different features and structures of the various aspects can be used in combination with others as desired. That one feature cannot be illustrated in all of the aspects is not meant to be construed that it cannot be, but is done for brevity of description. Thus, the various features of the different aspects can be mixed and matched as desired to form new aspects, whether or not the new aspects are expressly described. Combinations or permutations of features described herein are covered by this disclosure.

Further aspects of the invention are provided by the subject matter of the following clauses:

An air starter comprising, a housing defining an interior having a primary inlet and a primary outlet to define a primary air flow path from the primary inlet to the primary outlet, a nozzle located within the interior and having circumferentially spaced vanes, a shroud located within the interior and circumscribing at least a portion of the vanes, a turbine located within the interior, rotatable about a rotational axis, and having circumferentially spaced blades, a physical interference between at least one of the nozzle and the shroud or the shroud and the housing, and wherein the nozzle is axially constrained in downstream movement along the primary air flow path by the physical interference.

The air starter of any preceding clause 1 wherein the physical interference comprises a first physical interference between the nozzle and the shroud and a second physical interference between the shroud and the housing.

The air starter of any preceding clause wherein the first physical interference comprises a protrusion on at least one of the vanes or the shroud and a slot, receiving the protrusion, on the other of the vane or the shroud.

The air starter of any preceding clause wherein the protrusion is on the vanes and the slot is in the shroud.

The air starter of any preceding clause further comprising a turbine liner circumscribing at least a portion of the housing and having the portion radially aligned with a portion of the shroud to form the second physical interference.

The air starter of any preceding clause wherein the housing comprises an inlet housing defining the primary inlet and a turbine housing defining the primary outlet, and the turbine liner is part of the turbine housing.

The air starter of any preceding clause wherein the inlet housing comprises a seat receiving at least a portion of the nozzle.

The air starter of any preceding clause wherein the nozzle is radially constrained by the seat and axially unconstrained by the seat.

The air starter of any preceding clause wherein a radial gap is provided between at least one of the nozzle and the seat or the shroud and the seat.

The air starter of any preceding clause wherein an axial gap is provided between the shroud and the turbine liner.

An assembly comprising, a housing defining an interior having a primary inlet and a primary outlet to define a primary air flow path from the primary inlet to the primary outlet, a nozzle located within the interior and having circumferentially spaced vanes, a shroud located within the interior and circumscribing at least a portion of the vanes, a physical interference between at least one of the nozzle and the shroud or the shroud and the housing, and wherein the nozzle is axially constrained in downstream movement along the primary air flow path by the physical interference.

The assembly of any preceding clause wherein the physical interference comprises a first physical interference between the nozzle and the shroud and a second physical interference between the shroud and the housing.

The assembly of any preceding clause wherein the first physical interference comprises a protrusion on at least one of the vane or the shroud and a slot, receiving the protrusion, on the other of the vanes or the shroud.

The assembly of any preceding clause wherein the protrusion is on the vane and the slot is in the shroud.

The assembly of any preceding clause further comprising a liner having a portion radially aligned with a portion of the shroud to form the second physical interference.

The assembly of any preceding clause wherein the housing comprises an inlet housing defining the primary inlet and an outlet housing defining the primary outlet, and the liner is part of the outlet housing.

The assembly of any preceding clause wherein the inlet housing comprises a seat receiving at least a portion of the nozzle.

The assembly of any preceding clause wherein the nozzle is radially constrained by the seat and axially unconstrained by the seat.

The assembly of any preceding clause wherein a radial gap is provided between at least one of the nozzle and seat or the shroud and seat.

The assembly of any preceding clause wherein an axial gap is provided between the shroud and the liner.

This written description uses examples to describe aspects of the disclosure described herein, including the best mode, and also to enable any person skilled in the art to practice aspects of the disclosure, including making and using any devices or systems and performing any incorporated methods. The patentable scope of aspects of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. An assembly comprising:
  a housing defining an interior having a primary inlet and a primary outlet to define a primary air flow path from the primary inlet to the primary outlet;
  a nozzle located within the interior and having circumferentially spaced vanes, with at least one vane of the circumferentially spaced vanes including:
    a respective outer wall extending between a leading edge and a trailing edge, and between a root and a tip; and
    a respective protrusion extending from an upstream end to a downstream end, the upstream end being axially aligned with the leading edge, the downstream end being axially upstream of the trailing edge; and
  a shroud located within the interior and circumscribing at least a respective portion of the circumferentially spaced vanes;
  wherein the respective protrusion of the at least one vane is received within a respective portion of the shroud such that an axial downstream movement along the primary air flow path of the nozzle is limited by the shroud.

2. The assembly of claim 1, wherein the respective protrusion is received within a slot provided on the shroud.

3. The assembly of claim 1, wherein the housing further comprises a liner having a portion radially aligned with a portion of the shroud.

4. The assembly of claim 3, wherein the housing comprises an inlet housing defining the primary inlet and an outlet housing defining the primary outlet, and the liner is part of the outlet housing.

5. The assembly of claim 4, wherein the inlet housing comprises a seat receiving at least a portion of the nozzle.

6. The assembly of claim 5, wherein a radial gap is provided between at least one of the nozzle and the seat or the shroud and the seat.

7. The assembly of claim 5, wherein an axial gap is provided between the shroud and the liner, and wherein the liner limits an axial movement of the shroud within the axial gap.

8. The assembly of claim 1, wherein at least two vanes of the circumferentially spaced vanes include a respective protrusion.

9. The assembly of claim 1, wherein the respective protrusion is provided along a portion of the tip where the tip meets the leading edge of the at least one vane.

10. The assembly of claim 1, wherein the at least one vane includes an airfoil shape, with the respective protrusion being a radial projection of the at least one vane.

11. An air starter comprising:
a housing defining an interior having a primary inlet and a primary outlet to define a primary air flow path from the primary inlet to the primary outlet;
a blade located within the interior and rotatable about a rotational axis;
a shroud located within the interior, the shroud having:
a radially inner surface at least partially defining a respective portion of the primary air flow path;
a plurality of circumferentially segmented edges; and
a plurality of slots, with each slot of the plurality of slots being located between two adjacent circumferentially segmented edges of the plurality of circumferentially segmented edges circumferentially spaced along the edge, with respect to the rotational axis; and
a plurality of vanes at least partially circumscribed by the shroud, the plurality of vanes being provided within the primary air flow path, with each vane of the plurality of vanes having a respective outer wall extending between a root and a tip, and between a leading edge and a trailing edge, with at least two vanes of the plurality of vanes having:
a respective protrusion defining a radially raised portion of the tip of the respective outer wall, with respect to the rotational axis, the respective protrusion extending through a respective slot of the plurality of slots such that an axial downstream movement along the primary air flow path of the plurality of vanes is limited by the shroud.

12. The air starter of claim 11, wherein the housing further comprises a turbine liner circumscribing at least a portion of the blade, the turbine liner having a portion radially aligned with a portion of the shroud.

13. The air starter of claim 12, wherein the housing comprises an inlet housing defining the primary inlet and a turbine housing defining the primary outlet, and the turbine liner is part of the turbine housing.

14. The air starter of claim 13, wherein the inlet housing comprises a seat receiving at least a respective portion of the plurality of vanes.

15. The air starter of claim 12, wherein an axial gap is provided between the shroud and the turbine liner.

16. The air starter of claim 11, wherein each vane of the plurality of vanes has a respective protrusion.

17. The air starter of claim 11, wherein the shroud terminates upstream of the blade.

18. The air starter of claim 11, wherein the plurality of circumferentially segmented edges are an axially upstream plurality of circumferentially segmented edges of the shroud.

19. The air starter of claim 11, wherein a total number of slots of the plurality of slots corresponds to a total number of vanes of the plurality of vanes.

* * * * *